(12) United States Patent
Edara et al.

(10) Patent No.: US 9,571,339 B2
(45) Date of Patent: Feb. 14, 2017

(54) CONFIGURING AN ELECTRONIC DEVICE FOR WIRELESS COMMUNICATIONS

(71) Applicant: Amazon Technologies, Inc., Seattle, WA (US)

(72) Inventors: Kiran Kumar Edara, Cupertino, CA (US); Sandeep Rai, Fremont, CA (US); Felix Liu, San Jose, CA (US); Evan Duke Jeng, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 14/528,844

(22) Filed: Oct. 30, 2014

(65) Prior Publication Data

US 2016/0127176 A1  May 5, 2016

(51) Int. Cl.
| | |
|---|---|
| *H04B 1/38* | (2015.01) |
| *H04L 12/24* | (2006.01) |
| *H04B 1/3816* | (2015.01) |
| *H04W 8/20* | (2009.01) |
| *H04W 8/18* | (2009.01) |

(52) U.S. Cl.
CPC ......... *H04L 41/0806* (2013.01); *H04B 1/3816* (2013.01); *H04W 8/205* (2013.01); *H04W 8/183* (2013.01)

(58) Field of Classification Search
CPC ............ H04W 8/04; H04W 8/06; H04W 8/08; H04W 8/183; H04W 8/205; H04M 1/2535; H04B 1/38; H04B 1/3816; H04L 41/0806

See application file for complete search history.

(56) References Cited

U.S. PATENT DOCUMENTS

| | | | |
|---|---|---|---|
| 2004/0072591 A1* | 4/2004 | Andreini | H04W 24/00 455/558 |
| 2008/0081609 A1 | 4/2008 | Burgan et al. | |
| 2010/0291898 A1 | 11/2010 | Sanding et al. | |
| 2011/0294472 A1* | 12/2011 | Bramwell | H04W 8/04 455/413 |
| 2014/0057679 A1 | 2/2014 | Berionne et al. | |
| 2014/0274034 A1* | 9/2014 | Trapp | H04W 8/06 455/432.1 |

FOREIGN PATENT DOCUMENTS

| | | |
|---|---|---|
| EP | 2191685 | 8/2011 |
| WO | WO2009133410 | 11/2009 |

OTHER PUBLICATIONS

The PCT Search Report and Written Opinion mailed Jan. 29, 2016 for PCT application No. PCT/US2015/058211, 14 pages.

* cited by examiner

*Primary Examiner* — Thanh Le
(74) *Attorney, Agent, or Firm* — Lee & Hayes, PLLC

(57) ABSTRACT

In an implementation, an electronic device may obtain a configuration file from a device provider. The configuration file may include settings of a number of communications providers for communicating over a wireless wide area network. A subscriber identification module (SIM) card may include information, such as a communications provider identifier, that is utilized to determine the settings for a modem of the electronic device. Configuring the modem of the electronic device according to the settings may cause the modem to communicate over the wireless wide area network according to specifications of a particular communications provider of the plurality of communications providers.

20 Claims, 7 Drawing Sheets

CONFIGURING AN ELECTRONIC DEVICE FOR WIRELESS COMMUNICATIONS

BACKGROUND

Various electronic devices, such as smart phones, tablet computing devices, wearable computing devices, and the like, may communicate using a wireless wide area network. Typically, devices communicate over a wireless wide area network according to specifications specified by a communications provider. Communications providers may provide services for communicating via a wireless wide area network to individuals that purchase plans or subscriptions from the communications providers. Upon a user of an electronic device purchasing a subscription or plan from a particular communications provider, the electronic device may be configured for communications over a wireless wide area network according to the specifications of the particular communications provider.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
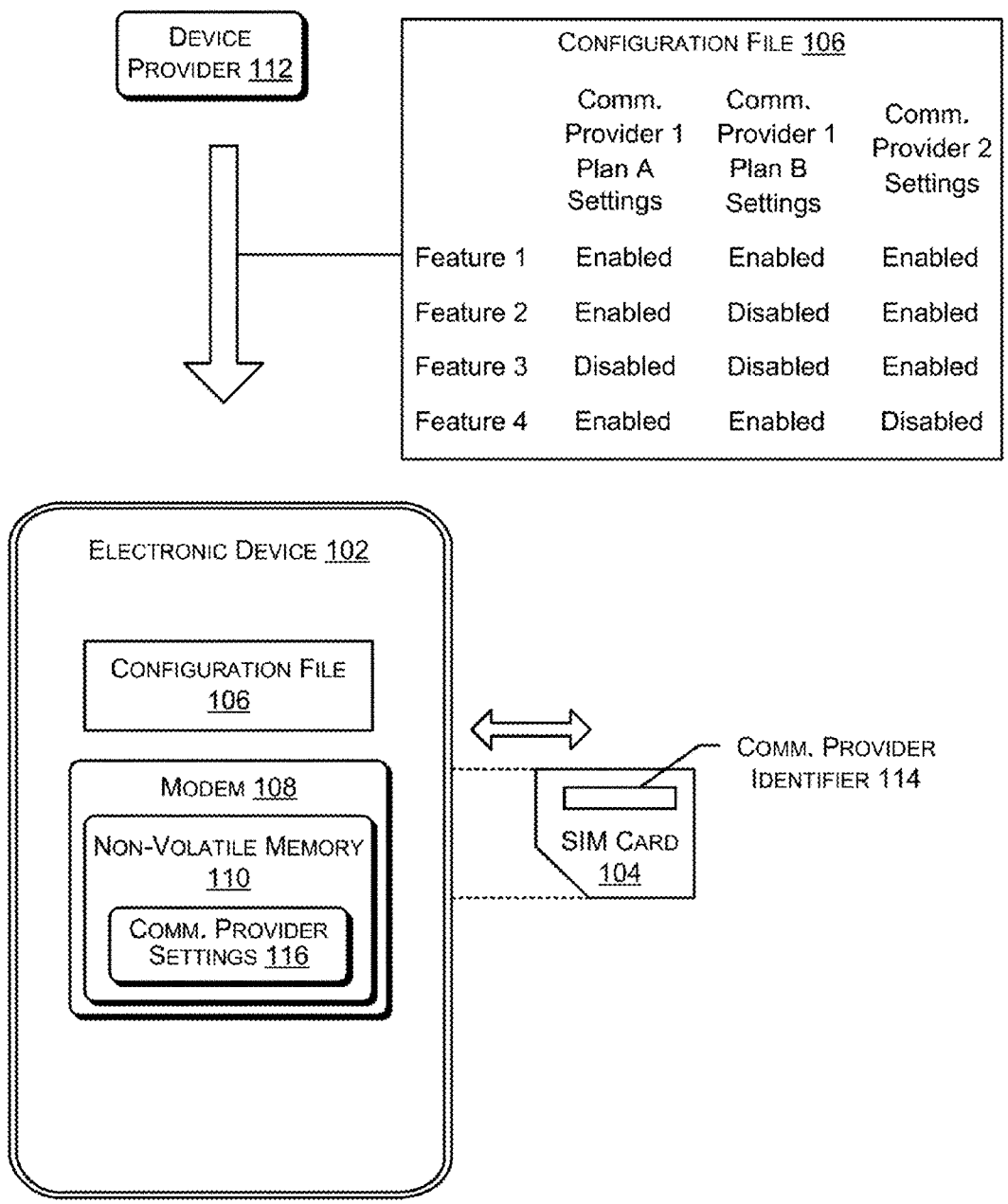
FIG. 1 illustrates a system for configuring an electronic device for wireless communications using a subscriber identification module (SIM) card and a configuration file.

Described herein are systems and processes to configure an electronic device for wireless communications. In many cases, electronic devices may be configured for wireless communications by a device provider. The device provider may provide electronic devices to users of the devices. In one example, a device provider may be an original equipment manufacturer (OEM) that sells electronic devices to consumers. In these situations, the OEM may configure electronic devices for wireless communications at the factory and consumers may acquire electronic devices that are preconfigured for wireless communications. In one example, an OEM may configure an electronic device for wireless communications after inserting a subscriber identification module (SIM) card into the electronic device. The SIM card may store information used to communicate via a wireless wide area network using a particular communications provider. The SIM card may be removable from the electronic device, in some instances, while in other situations, the SIM card is non-removable (i.e., not intended to be removed from the device).

Configuring an electronic device for wireless communications may include setting one or more components of the electronic device to communicate via a wireless wide area network. The wireless wide area network may include a Global System for Mobile Communications (GSM) network, a Long-Term Evolution (LTE) network, a Universal Mobile Telecommunications System (UMTS) network, a code division multiple access (CDMA) network, or a combination thereof. Devices may communicate via a wireless wide area network according to specifications of communications providers. Specifications of communications providers may identify information that is exchanged between electronic devices and the communications provider for communicating via a wireless wide area network. Additionally, specifications of communications providers may specify information exchanged between electronic devices and components of a wireless wide area network. In some cases, the specifications of a communications provider may relate to security measures for communications over a wireless wide area network. Further, the specifications of a communications provider may relate to the efficiency of communication over a wireless wide area network. The specifications of a communications provider may also relate to authentication of devices over a wireless wide area network.

In scenarios where an electronic device is configured for communications by the device provider and before being distributed to a user, the settings of a particular communications provider may be stored in the modem of the electronic device. In many instances, in order for an electronic device to be configured to communicate properly via a wireless wide area network using a different communications provider, the settings of the modem are modified by the device provider. Thus, the electronic device may be sent back to the device provider to modify the settings of the modem according to the specifications of the different communications provider.

According to implementations described herein, settings of a modem utilized by an electronic device for communications via a wireless wide area network are modified without sending the electronic device back to the device provider. In an implementation, a configuration file is provided to the electronic device that includes settings to be used by the electronic device to communicate via a wireless wide area network according to specifications of multiple communications providers. The electronic device may determine a communications provider that is to provide communications via the wireless wide area network and implement the settings of the configuration file for that communications provider. In some cases, the communications provider to provide communications for the electronic device may be identified according to information stored on a SIM card associated with the electronic device. In some implementations, an electronic device may be configured according to settings of a particular communications provider when the SIM card is inserted into the electronic device.

Additionally, the configuration of an electronic device may be modified by changing the configuration file stored by the electronic device. In an implementation, the device provider may modify a configuration file and send the modified configuration file to the electronic device when one or more communications providers change their respective specifications for communicating via the wireless wide area network. In one example, the configuration file may be modified to reflect changes of the specifications of a communications provider by which the electronic device communicates over the wireless wide area network. In another example, the configuration of an electronic device may be modified when a different communications provider is to provide services to the electronic device in relation to communicating via the wireless wide area network. To illustrate, a user of the electronic device may become a subscriber of a communications provider that is different from a previous communications provider utilized by the user.

By utilizing a configuration file to configure an electronic device to communicate via a wireless wide area network, modifications to the configuration of the electronic device may be instituted by changing the configuration file rather than modifying software and/or firmware of the electronic device. In addition, the configuring of the electronic device may occur without sending the electronic device back to the device provider that made the electronic device available to a user. Instead, the device provider may provide an updated configuration file to the electronic device and the electronic device may be reconfigured according to the updated configuration file. In this way, users of electronic devices may more conveniently change the communications providers utilized to communicate via wireless wide area networks. Furthermore, configurations of electronic devices may be kept up to date without a user, a device provider, or both making changes to software and/or firmware of components of the electronic devices. Maintaining the configuration of an electronic device according to updated specifications of communications providers may result in the electronic device operating more efficiently and/or the electronic device communicating in a more secure manner via a wireless wide area network. In this way, customer satisfaction with the device provider, the communications provider, or both may result.

FIG. 1 illustrates a system 100 for configuring the electronic device 102 for wireless communications using a SIM 104 card and a configuration file 106. In the illustrative implementation of FIG. 1, the SIM card 104 may be inserted into the electronic device 102 and removed from the electronic device 102 via a slot in the electronic device 102. The electronic device 102 may also include a modem 108 having a non-volatile memory 110. In an implementation, the non-volatile memory 110 may store firmware, software, or both for implementing information included in the configuration file 106.

The electronic device 102 may obtain the configuration file 106 from a device provider 112. In some cases, the device provider 112 may be an original equipment manufacturer (OEM) of the electronic device 102. In the illustrative implementation of FIG. 1, the configuration file 120 includes information regarding features that may be implemented by electronic devices according to specifications of communications providers. The communications providers may provide services for communicating over wireless wide area networks. In some scenarios, different features may be specified by communications providers for different plans offered by the communications providers. For example, the configuration file 106 may include settings for Plan A of a first communications provider and settings for Plan B of the first communications provider for communications over a wireless wide area network. The configuration file 106 may also include settings for a second communications provider in relation to communications over a wireless wide area network.

The settings in the configuration file 106 may indicate that features related to communicating via a wireless wide area network are enabled or disabled. In one example, the configuration file 106 may indicate that a handover feature is enabled when the modem 108 switches from communicating via a fourth generation (4G) wireless network to a third generation (3G) wireless network. In another example, the configuration file 106 may indicate that assisted Geographic Positioning System (GPS) support is disabled. In an additional example, the configuration file 106 may indicate a network mode preference, such as a priority for using a LTE network, a CDMA network, or a GSM network.

The configuration file 106 may indicate that different features are enabled for Plan A of the first communications provider than for Plan B of the first communications provider. For example, Feature 2 is enabled for Plan A of the first communications provider, while Feature 2 is disabled for Plan B of the first communications provider. Additionally, Feature 3 is disabled for Plan A of the first communications provider and Feature 3 is enabled for Plan B of the first communications provider. Further, different features may be enabled for different communications providers. To illustrate, Feature 4 is enabled for Plan A and Plan B of the first communications provider, but disabled for the settings of the second communications provider.

In an implementation, the SIM card 104 may be inserted into the electronic device 102 and information stored on the SIM card 104 may be accessed by the electronic device 102 to determine a communications provider associated with the SIM card 104. In one example, the SIM card 104 may include a communications provider identifier 114. In some cases, the SIM card 104 may also include information indicating a plan acquired by a user of the electronic device 102. In an illustrative implementation, the electronic device 102 may, based at least in part on the information stored on the SIM card 104, determine that the electronic device 102 is to communicate via a wireless wide area network via settings associated with Plan A of the first communications provider. In these situations, the modem 108 may access the first communication provider Plan A settings and store the settings in the non-volatile memory 110 as communication provider settings 116. As the modem 108 operates to communicate over a wireless wide area network, the modem 108 may utilize the communication provider settings 116 to determine features to enable or disable. To illustrate, the modem 108 may enable Feature 1, Feature 2, and Feature 4, while disabling Feature 3 for communications over a wireless wide area network when the settings of the first communication provider Plan A are stored in the non-volatile memory 110.

Figure 2:
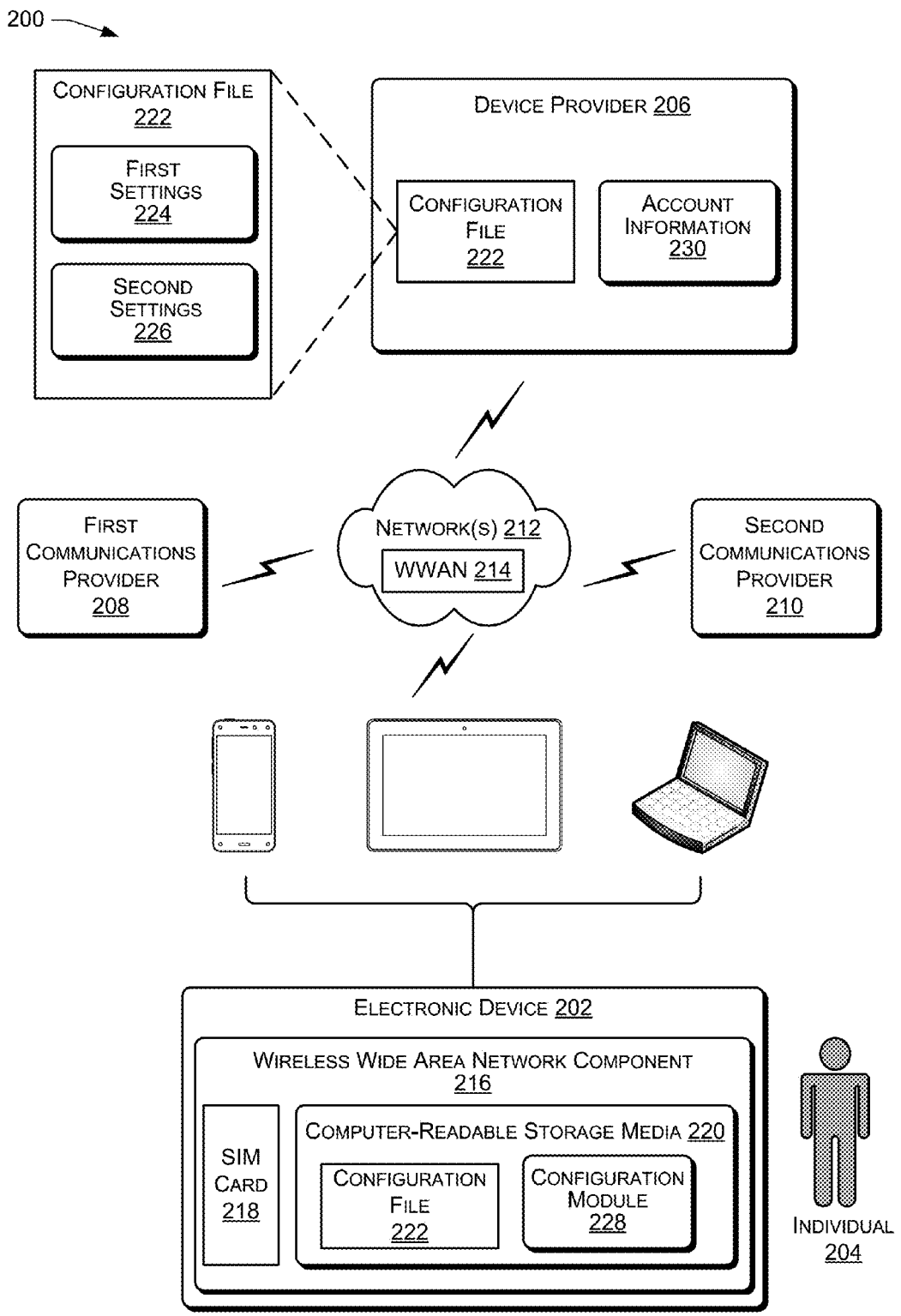
FIG. 2 illustrates a system for configuring an electronic device for wireless communications.

FIG. 2 illustrates a system 200 for configuring an electronic device 202 for wireless communications. The electronic device 202 may include components to communicate via a wireless wide area network. The electronic device 202 may include a portable electronic device, such as a smart phone, a tablet computing device, an electronic book reader device, a media playing device, a portable gaming device, a laptop computing device, a netbook computing device, a wearable computing device (e.g., watch, glasses), or a combination thereof. The electronic device 202 may also include a desktop computing device, a gaming console, a set-top box, an appliance, a television, or a combination thereof. The electronic device 202 may be operated by an individual 204.

The system 200 also includes a device provider 206 that provides devices to individuals. In some cases, individuals may acquire devices directly from the device provider 206, such as via a physical location or premises of the device provider 206, an online website of the device provider 206, or both. In other cases, an individual may acquire an electronic device from a retailer that is supplied by the device provider 206. In an implementation, the device provider 206 may be an original equipment manufacturer (OEM).

The system 200 also includes a first communications provider 208 and a second communications provider 210. The first communications provider 208 and the second communications provider 210 may provide services for electronic devices to communicate over a wireless wide area network. In some cases, the first communications provider 208 and the second communications provider 210 may provide specifications for electronic devices to communicate via a wireless wide area network. In an implementation, the first communications provider 208 and the second communications provider 210 may specify that particular communications features are to be implemented when communicating using a wireless wide area network. Communications features enumerated by specifications of communications providers may include techniques to switch from one type of communications network to a different type of communications network. For example, communications features included in specifications of a communications provider may include procedures to switch between a third generation (3G) network and a fourth generation (4G) network. In another example, the first communications provider 208, the second communications provider 210, or both may specify that particular messaging features, such as text messages, photo messages, video messages, or a combination thereof, are enabled or disabled when communicating using a wireless wide area network. Further, the first communications provider 208, the second communications provider 210, or both may specify that global positioning system (GPS) features are enabled or disabled when communicating over a wireless wide area network.

The specifications provided by the first communications provider 208 and the second communications provider 210 may also specify that particular authentication information is to be included in communications via a wireless wide area network. In some cases, the authentication information may include an identifier of a user of the electronic device 202, such as an identifier of the individual 204. In other cases, the authentication information may include an identifier of the electronic device 202. In other situations, the first communications provider 208, the second communications provider 210, or both may provide specifications that indicate encryption algorithms to be used by electronic devices. In still another example, the first communications provider 208, the second communications provider 210, or both may provide specifications that indicate an order of priority for selecting a technology of a wireless wide area network, such an order of priority for selecting between a LTE network, a CDMA network, or a GSM network.

The system 200 may include one or more networks 212 that may be utilized by devices of the system 200 for communications. The one or more networks 212 may include one or more of the Internet, a cable network, a satellite network, a wireless wide area network, such as WWAN 214, a wired local area network, a wireless local area network, or a public switched telephone network (PSTN). Communications over the one or more networks 212 may utilize communications protocols, including packet-based and/or datagram-based protocols such as internet protocol (IP), transmission control protocol (TCP), user datagram protocol (UDP), or other types of protocols. Moreover, the one or more networks 212 may also include a number of devices that facilitate communications and/or form a hardware basis for the one or more networks 212, such as switches, routers, gateways, access points, firewalls, base stations, repeaters, backbone devices, and the like.

The electronic device 202 may include a wireless wide area network component 216 for the electronic device 202 to communicate signals via the wireless wide area network 214. In an illustrative implementation, the wireless wide area network component 216 may include a modem to modulate and demodulate signals communicated over the wireless wide area network 214. The wireless wide area network component 216 may also include a SIM card 218. In some cases, the SIM card 218 may be removable from the electronic device 202. For example, the SIM card 218 may be inserted and removed from the electronic device 202 via a slot formed along an edge of the electronic device 202. In other instances, the SIM card 218 may be non-removable from the electronic device 202. To illustrate, the SIM card 218 may be an embedded SIM card. Although the illustrative implementation of FIG. 2 shows the SIM card 218 as part of the wireless wide area network component 216, the SIM card 218 may be coupled to the wireless wide area network component 216, such as via an interface.

The wireless wide area network component 216 may also include one or more computer-readable storage media 220 that include volatile and nonvolatile memory and/or removable and non-removable media implemented in any type of technology for storage of information, such as computer-readable instructions, data structures, program modules or other data. The one or more computer-readable storage media 220 may include, but are not limited to, RAM, ROM, EEPROM, flash memory or other memory technology, CD-ROM, digital versatile disks (DVD) or other optical storage, magnetic cassettes, magnetic tape, solid state storage, magnetic disk storage, or any other medium that can be used to store the desired information and that can be accessed for use by the electronic device 202. In an implementation, the computer-readable storage media 220 may include non-transitory media. In an illustrative implementation, the computer-readable storage media 220 may include non-volatile memory.

The computer-readable storage media 220 may store at least a portion of a configuration file 222 that includes information to configure the electronic device 202 for communications via the wireless wide area network 214. The electronic device 202 may receive the configuration file 222 from the device provider 206. In an implementation, the configuration file 222 may include settings for the wireless wide area network component 216 to implement specifications set by one or more communications providers for communicating using the wireless wide area network 214. In an illustrative implementation, the configuration file 222 may include settings for the wireless wide area network component 216 to implement specifications of the first communications provider 208, the second communications provider 210, or both. For example, in some implementations, the configuration file 222 may include first settings 224 to implement specifications of the first communications provider 208 and second settings 226 to implement specifications of the second communications provider 210. In other implementations, the computer-readable storage media 220 may store a portion of the configuration file 220, such as at least a portion of the first settings 224, at least a portion of the second settings 226, or a portion of the first settings 224 and a portion of the second settings 226.

The computer-readable storage media 220 of the wireless wide area network component 216 may also include a configuration module 228 that implements information included in the configuration file 222 for the electronic device 202 to communicate via the wireless wide area network 214. For example, the configuration module 228 may determine that the first settings 224 of the configuration file 222 specify that the wireless wide area network component 216 is to implement a particular handover procedure when the electronic device 202 switches between communicating using a 3G network and a 4G network. Additionally, the configuration module 228 may cause the wireless wide area network component 216 to implement the particular handover procedure when the wireless wide area network component 216 determines that switching from a 3G network to a 4G network is to take place. In some cases, the configuration module 228 may include software, hardware, firmware, or a combination thereof.

In addition to producing and storing the configuration file 222, the device provider 206 may store account information 230. The account information 230 may include information about individuals that acquired respective electronic devices from the device provider 206 and that have an account with the device provider 206. The account information 230 may include identifiers of individuals, contact information of individuals, subscription or plan information for individuals with communications providers, identifiers of electronic devices acquired by individuals, models of electronic devices acquired by individuals, features of electronic devices acquired by individuals, purchase history of individuals with regard to items offered for acquisition by the device provider 206, or combinations thereof. In some cases, the account information 230 may be obtained from individuals acquiring electronic devices from the device provider 206, from communications providers, or both.

In an illustrative implementation, the individual 204 may acquire the electronic device 202 from the device provider 206. In addition, the individual 204 may acquire a plan from the first communications provider 208 for the electronic device 102 to communicate via the wireless wide area network 214. After acquiring the electronic device 202 from the device provider 206 and the plan from the first communications provider 208, the electronic device 202 may be configured for communications over the wireless wide area network 214 according to the specifications of the first communications provider 208 based on the first settings 224. For example, the configuration module 228 may access information from the SIM card 218 indicating that the individual 204 acquired a plan from the first communications provider 208. The configuration module 228 may then access the first settings 224 from the configuration file 222 since the first settings 224 correspond to the specifications of the first communications provider 208 from which the individual 204 acquired a plan for communicating via the wireless wide area network 214. In some cases, the configuration module 228 may implement the first settings 224 by enabling features for communicating over the wireless wide area network 214, disabling features for communicating over the wireless wide area network 214, or both.

In some cases, the configuration file 222 may be preloaded onto the electronic device 202 before the electronic device 202 is acquired by the individual 104. In other instances, the configuration file 222 may be obtained from the device provider 206 after the individual acquires the electronic device 202 from the device provider 206. For example, the device provider 206 may send the configuration file 222 to the electronic device 202 when the individual 204 registers the electronic device 202 with the device provider 206. To illustrate, the device provider 206 may receive identification information related to an account of the individual 204 with the device provider 206 from the electronic device 202 when the individual 204 registers the electronic device 202 with the device provider 206. In response to receiving the information of the individual 204, the device provider 206 may compare the received information with the account information 230 and identify an appropriate configuration file to send to the electronic device 202. In various implementations, the configuration file 222 may be sent to the electronic device 202 via the wireless wide area network 214. In other implementations, the configuration file 222 may be sent to the electronic device 202 via a local area network, such as a wired local area network or a wireless local area network.

Additionally, the device provider 206 may update the configuration file 222. In some implementations, the updates to the configuration file 222 may be obtained when the individual 204 provides the electronic device 202 to the device provider 206 for updating. For example, individual 204 may send the electronic device 202 to the device provider 206 or personally deliver the electronic device 202 to a location of the device provider 206. In other implementations, the updates to the configuration file 222 may be obtained by providing the electronic device 202 to a retailer that sold the electronic device 202 to the individual 204. In still other implementations, the device provider 206 may send the updated configuration file 222 to the electronic device 202 via the one or more networks 212. In one illustrative example, the first communications provider 208 may update the first settings 224. In this situation, the device provider 206 may receive the new communications settings from the first communications provider 208 and update the configuration file 222 accordingly. After receiving the updates to the configuration file 222 from the device provider 206, the configuration module 228 may implement changes to the wireless wide area network component 216 based on the updates to the configuration file 222. In some cases, updates to the configuration file 222 may improve the efficiency of communications of the electronic device 202 via the wireless wide area network 214. The updates to the configuration file 222 may also improve security of the communications of the electronic device 202 via the wireless wide area network 214.

In an implementation, the electronic device 202 may check to see if a version of the configuration file stored in the computer-readable storage media 220 matches a current version of the configuration file stored by the device provider 206. In some cases, the configuration module 228 may send a query to the device provider 206 to determine whether the version of the configuration file stored in the computer-readable storage media 220 matches the current version of the configuration file stored by the device provider 206. In situations where the version of the configuration file stored in the computer-readable storage media 220 does not match the current version of the configuration file stored by the device provider 206, the configuration module 228 may obtain the current version of the configuration file from the device provider 206. At least partly in response to receiving the current version of the configuration file from the device provider 206, the configuration module 228 may configure the wireless wide area network component 216 to communicate over the wireless wide area network 214 according to the current version of the configuration file.

Figure 3:
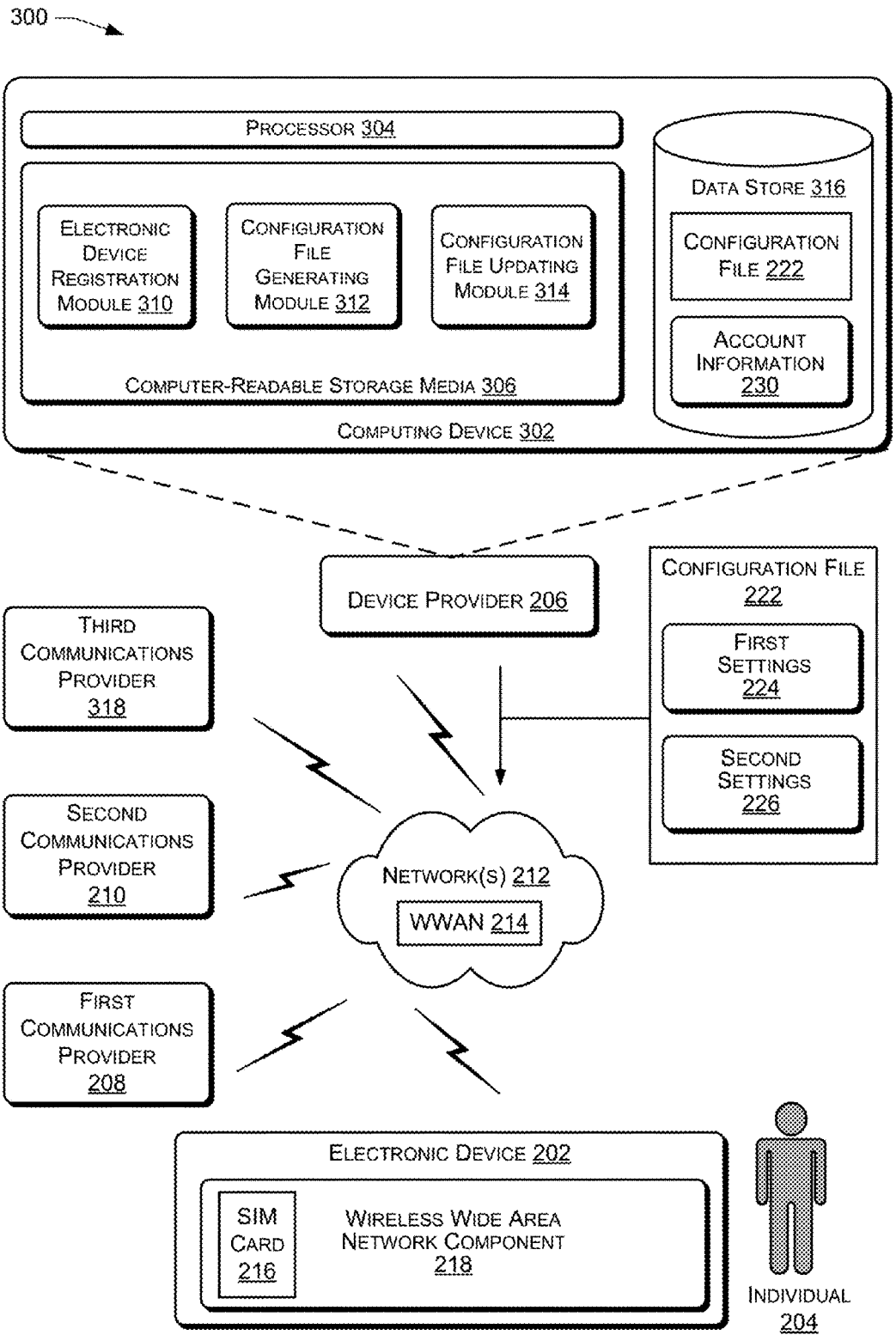
FIG. 3 illustrates a system including a device provider to provide a configuration file to an electronic device to configure the electronic device for wireless communications.

FIG. 3 illustrates a system 300 including the device provider 206 to provide the configuration file 222 to the electronic device 202 to configure the electronic device 202 for wireless communications. The device provider 206 may include one or more computing devices, such as computing device 302. In some cases, the computing device 302 may include a server computing device. In an implementation, the computing device 302 may be part of a cloud computing architecture of the device provider 302. The computing device 302 may also be part of a distributed computing architecture.

The computing device 302 may include one or more processors, such as processor 306. The one or more processors 306 may include at least one hardware processor, such as a microprocessor. In some cases, the one or more processors 306 may include a central processing unit (CPU), a graphics processing unit (GPU), or both a CPU and GPU, or other processing units. Additionally, the one or more processors 306 may include a local memory that may store program modules, program data, and/or one or more operating systems.

In addition, the computing device 302 may include one or more computer-readable storage media, such as computer-readable storage media 306. The computer-readable storage media 306 may include volatile and nonvolatile memory and/or removable and non-removable media implemented in any type of technology for storage of information, such as computer-readable instructions, data structures, program modules or other data. Such computer-readable storage media 306 may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the computing device 302, the computer-readable storage media 306 may be a type of tangible computer-readable storage media and may be a non-transitory storage media.

The computer-readable storage media 306 may be used to store any number of functional components that are executable by the one or more processors 304. In many implementations, these functional components comprise instructions or programs that are executable by the one or more processors 304 and that, when executed, implement operational logic for performing the operations attributed herein to the computing device 302. Functional components of the computing device 302 that may be executed on the one or more processors 304 for implementing the various functions and features related to configuring an electronic device for wireless communications, as described herein, include an electronic device registration module 310, a configuration file generating module 312, and a configuration file updating module 314.

The computing device 302 may also include, or is coupled to, a data store 316 that may include, but is not limited to, RAM, ROM, EEPROM, flash memory, one or more hard disks, solid state drives, optical memory (e.g. CD, DVD), or other non-transient memory technologies. In an implementation, at least a portion of the data stored by the data store 316 may be located remotely from the computing device 302 and be accessible by a number of computing devices of the device provider 302. In some cases, the data store 316 may be accessible by third parties.

The data store 316 may maintain information that is utilized by the computing device 302 to perform operations related to configuring electronic devices for wireless communications. For example, the date store 316 may store one or more configuration files, such as the configuration file 222. The configuration file 222 may include settings used to implement features utilized to communicate via wireless wide area networks. In some cases, the configuration file 222 may include respective settings for each of a number of communications providers. Additionally, the configuration file 222 may include settings for one or more plans offered by one or more communications providers. For example, a communications provider may provide a number of plans that offer different levels of service, provide different services for use by individuals subscribing to the plans, or both. To illustrate, the first communications provider 108 may offer a plan that includes the use of a messaging service over a wireless wide area network. In another example, the first communications provider 108 may offer a plan that utilizes a handover feature when an electronic device switches between a 3G network and a 4G network.

The data store 316 may also store account information 230 for individuals that have an account with the device provider 206. In some cases, individuals may obtain an account with the device provider 206 after acquiring one or more items from the device provider 206. In other cases, individuals may obtain an account with the device provider 206 without acquiring an item from the device provider 206, but by providing the device provider 206 with information. In an implementation, the account information 230 may include a purchase history of individuals with the device provider 206, one or more identifiers of individuals (e.g., first name, last name, account number, login identifier), contact information of the individuals (e.g., email address, phone number, residence address, etc.), information about electronic devices acquired from the device provider 206 (e.g., model number, unique identifier of the electronic devices (e.g., stock keeping unit, universal product code, international article number)), manufacturer of one or more components of the electronic devices, combinations thereof, and the like.

Additionally, the account information 230 may include authentication information used by electronic devices for communications over the one or more networks 212, such as authentication information for communications over the wireless wide area network 214. In an illustrative implementation, authentication information may also include one or more passwords. The one or more passwords may be used to access information associated with an account with the device provider 206. Further, the one or more passwords may be used in communications over the one or more networks 212 to improve the security of communications over the one or more networks 212.

The account information 230 may also indicate one or more plans that individuals have acquired from communications providers. A plan acquired by a communications provider may specify usage of a wireless wide area network by one or more electronic devices utilized by an individual or a group of individuals associated with the plan. The usage of the wireless wide area network may relate to an amount of time that a wireless wide area network is used by one or more electronic devices associated with a plan, an amount of data communicated over the wireless wide area network by one or more electronic devices associated with the plan, or both. In addition, a plan may specify a period of time for which an individual or group of individuals is to utilize a particular communications provider to communicate over a wireless wide area network.

In an implementation, an individual may acquire a plan provided by a communications provider for communicating over a wireless wide area network, such as the wireless wide area network 214. In some cases, an individual may acquire a plan by paying a subscription fee to a communications provider on a periodic basis, such as a weekly basis, a monthly basis, an annual basis, etc. Additionally, an individual may acquire a plan by paying for usage of a particular wireless wide area network. Furthermore, a plan may be modified by an individual. In some scenarios, the plan may be modified for a temporary amount of time. For example, an individual may change a plan with a communications provider while travelling in one or more countries that are different from a home country for the individual. In other situations, an individual may change a plan with a communications provider by modifying an amount of usage of a wireless wide area network, by modifying features available for electronic devices to use over a wireless wide area network, by changing electronic devices being used to communicate over a wireless wide area network, or a combination thereof.

The account information 230 may indicate a plan associated with an individual using an identifier of the plan. In addition, the account information 230 may indicate features of the plans acquired by individuals. In some cases, the device provider 206 may obtain at least a portion of the account information 230 from the communications provider. In a particular implementation, the device provider 206 may obtain usage information from communications providers indicating usage of one or more services provided by the communications providers. In an illustrative implementation, the account information 230 may include an amount of data communicated by an individual or an electronic device over the wireless wide area network 214, an amount of time spent by an individual or an electronic device on the wireless wide area network 214, a number of messages communicated by an individual or electronic device over the wireless wide area network 214, or a combination thereof.

In regard to the configuration of electronic devices for communications via a wireless wide area network, the electronic device registration module 310 may include instructions executable by the processor 304 to register an electronic device, such as the electronic device 202 with the device provider 206. For example, after the individual 204 acquires the electronic device 202 from the device provider 206, the electronic device registration module 310 may receive information from the electronic device 202 indicating that the electronic device 202 has been activated. The information may be received via the one or more networks 212, such as the Internet, a wireless wide area network, a wireless local area network, and so forth. In some cases, the information received from the electronic device 202 may include a signal from the electronic device 202 indicating that the electronic device 202 is communicating over a wireless wide area network, the Internet, or both. In other cases, the information may be related to an account of the individual 204 with the device provider 206, such as an identifier of the individual 204.

The electronic device registration module 310 may also receive a device identifier corresponding to the electronic device 202. In some cases, the individual 204 may have a plurality of electronic devices acquired from the device provider 206 with the electronic device 202 being one of the plurality of electronic devices. In various implementations, the electronic device registration module 310 may send information to a communications provider specifying features of the electronic device 202 that are enabled or disabled for the electronic device 202. For example, different device providers may manufacture electronic devices and/or make electronic devices available for acquisition by individuals that have different features enabled. To illustrate, a first device provider may manufacture electronic devices that utilize a handover feature when changing from communicating via a 3G wireless wide area network to a 4G wireless wide area network, while a second device provider does not enable this feature. Therefore, in some scenarios, at least partly in response to receiving a device identifier from the electronic device 202, the electronic device registration module 310 may determine features of the electronic device 202 and send the information regarding the features of the electronic device 202 to a communications provider. In this way, the communications provider may manage communications by the electronic device 202 over a wireless wide area network in accordance with the features of the electronic device 202 that have been enabled and/or disabled. In illustrative implementations, the features of the electronic device 202 that are enabled and/or disabled may be based, at least in part, on a plan of the individual 202 with the communications provider, components of the electronic device 202 (e.g., hardware, software, firmware), or both.

In a particular implementation, the electronic device registration module 310 may receive information from the electronic device 202 after the SIM card 216 is inserted into the electronic device 202. In other implementations when the SIM card 216 is an embedded component of the wireless wide area network component 218, the electronic device registration module 310 may receive information from the electronic device 202 after activation of the wireless wide area network component 218.

In response to receiving the activation information from the electronic device 202, the electronic device registration module 310 may send the configuration file 222 to the electronic device 202. The configuration file 222 may include the first settings 224 and the second settings 226. In an implementation, the first settings 224 may correspond to specifications of the first communications provider 208 for communicating via the wireless wide area network 214 and the second settings 226 may correspond to specifications of the second communications provider 210 for communicating via the wireless wide area network 214. In another implementation, the first settings 224 may correspond to specifications of a first plan of the first communications provider 208 for communicating via the wireless wide area network 214 and the second settings 226 may correspond to specifications of a second plan of the first communications provider 208 for communicating via the wireless wide area network 214.

In some implementations, an initial configuration file may be pre-stored on the electronic device 202 by the device provider 206 before offering the electronic device 202 for acquisition. In these situations, the wireless wide area network component 218 may utilize settings from the initial configuration file to initiate communications with the device provider 206 upon an initial activation of the electronic device 202 by the individual 204. In other cases, the electronic device 202 may establish communications with the device provider 206 over a local area network, such as a wired local area network or a wireless local area network. After establishing communications with the device provider 206 in this manner, the electronic device registration module 310 may send the configuration file 222 to the electronic device 202. In these instances, the initial configuration file may include a minimum amount of information for the electronic device 202 to communicate with the device provider 206, while the configuration file 222 includes additional information to configure a full set of features for communications over the wireless wide area network. In other situations, the configuration file 222 may be an updated version of the initial configuration file pre-stored on the electronic device 202.

In an implementation, configuration files may be produced by the configuration file generating module 312 using information from communications providers to implement specifications of the communications providers for communicating over wireless wide area networks. For example, the configuration file generating module 312 may generate the configuration file 222 using information obtained from the first communications provider 208, the second communications provider 210, or both. In some cases, the configuration file generating module 312 may obtain specifications from one or more communications providers and determine settings for features used to communicate over the wireless wide area network 214 based at least partly on the specifications of the one or more communications providers. For example, the configuration file generating module 312 may receive a specification from the first communications provider 208 to utilize a handover feature when switching between a 3G network and a 4G network. Continuing with this example, when generating the settings for the configuration file 222, the configuration file generating module 312 may indicate with respect to the first settings 224 that the handover feature is enabled.

After generating the configuration file 220, updates to the specifications of communications providers may be obtained from the communications providers. In these instances, the configuration file updating module 314 may update the configuration file 222 to produce an updated version of the configuration file 222. In some situations, updates to the configuration file 222 may indicate changes to specifications promulgated by communications providers for communicating via the wireless wide area network 214. For example, the updates to the configuration file 222 may indicate that information transmitted over the wireless wide area network in association with the first communications provider 208 are to be communicated using a particular authentication technique. Continuing with this example, the configuration file updating module 314 may update the configuration file 222 to indicate that a feature corresponding to implementing the particular authentication technique is enabled for communications associated with the first communications provider 208. An updated version of a configuration file may also be sent to the electronic device 202 when changes are made to a plan of the individual with a communications provider. In some cases, the changes to the plan may be initiated by the communications provider, while in other implementations, the changes to the plan may be initiated by the individual 204.

In addition, updates to the configuration file 222 may be obtained from an additional communications provider having specifications that were not previously included in the configuration file 222. To illustrate, the configuration file updating module 314 may obtain specifications of the third communications provider 318. In these situations, the configuration file updating module 314 may add settings to the configuration file 222 indicating that features used to communicate via the wireless wide area network 214 are enabled or disabled according to the specifications of the third communications provider 318. In some cases, one or more of the settings for the third communications provider 318 in the updated version of the configuration file 222 may be the same as one or more settings of the first communications provider 208 and/or one or more settings of the second communications provider 210. In other instances, one or more settings for the third communications provider 318 in the updated version of the configuration file 222 may be different from one or more settings of the first communications provider 208 and/or one or more settings of the second communications provider 210.

Furthermore, an updated version of the configuration file 222 may be sent by the configuration file updating module 314 to the electronic device 202 at least partly in response to receiving a query from the electronic device 202. To illustrate, the configuration file updating module 314 may receive a query from the electronic device 202 to determine whether a version of the configuration file 222 stored on the electronic device 202 matches a current version of the configuration file 222 stored in the data store 316. In cases where the version of the configuration file 222 stored on the electronic device 202 does not match the current version of the configuration file 222, the configuration file updating module 314 may send the current version of the configuration file 222 to the electronic device 202 as an updated version of the configuration file 222.

Figure 4:
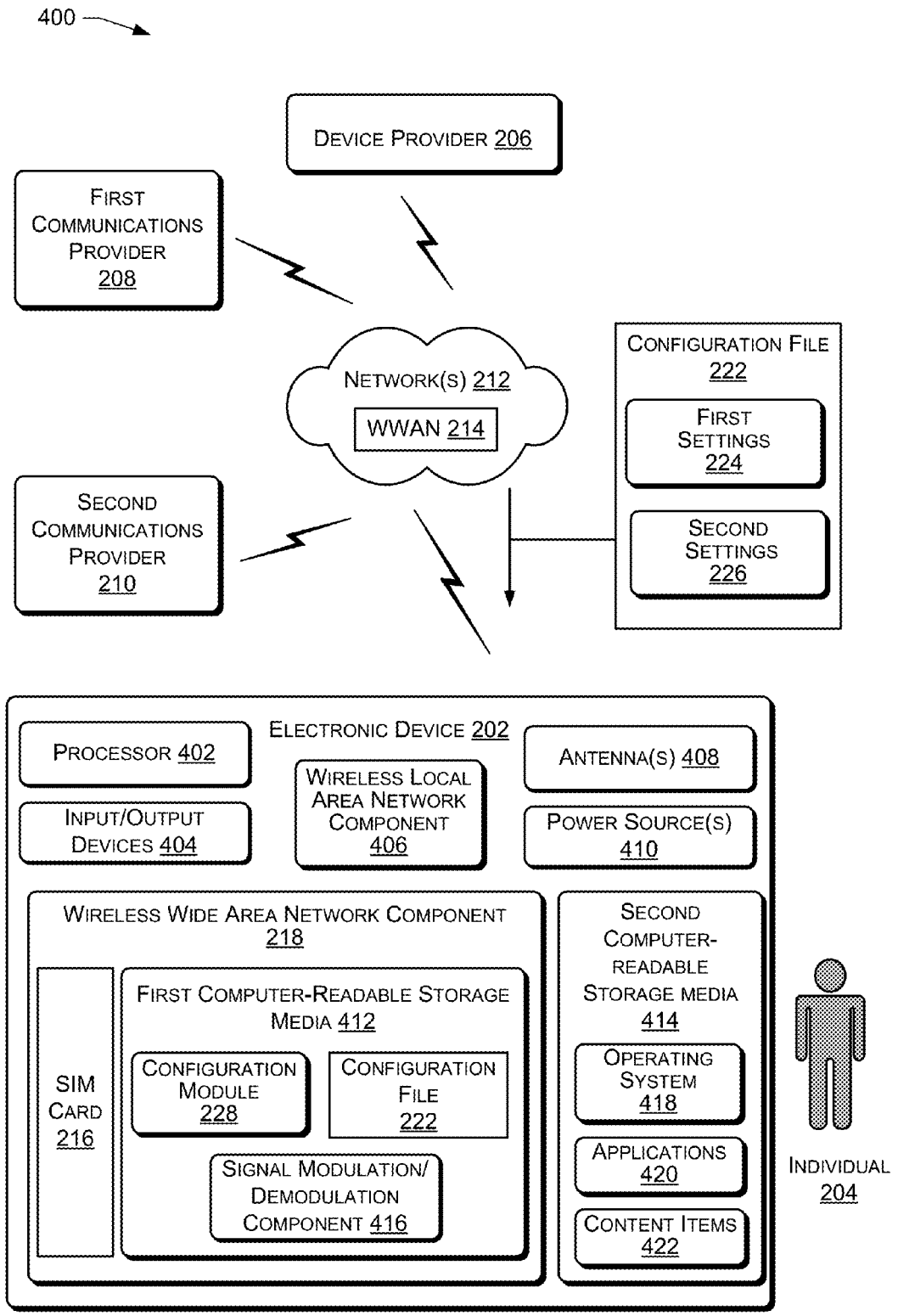
FIG. 4 illustrates a system including an electronic device to receive a configuration file used to configure the electronic device for wireless communications.

FIG. 4 illustrates a system 400 including the electronic device 202 that receives the configuration file 222 that is used to configure the electronic device 202 for wireless communications. The electronic device 202 may include a number of components related to accessing content using the electronic device 202, storing data, and communicating via the one or more networks 212. For example, the electronic device 202 may include one or more processors, such as a representative processor 402. The processor 402 may include a hardware processing unit, such as a central processing unit, a graphics processing unit, or both. The electronic device 202 may also include input/output devices 404. The input/output devices 404 may include one or more display devices, such as an electronic paper display, a liquid crystal display, a touch screen display, a display utilizing another type of display technology, or a combination thereof. The input/output devices 404 may also include a keypad, a keyboard, a pointer device, one or more speakers, a microphone, one or more cameras, combinations thereof, and the like.

In addition, the electronic device 202 may include a wireless local area network component 406 that communicates signals via wireless local area networks. The electronic device 202 may also include one or more antennas 408 to communicate signals over wireless networks. For example, the wireless location area network component 406 may utilize the one or more antennas 408 to communicate signals via a wireless local area network. In another example, the wireless wide area network component 218 may utilize the one or more antennas 408 to communicate signals via a wireless wide area network, such as the wireless wide area network 214. Further, the electronic device 202 may include one or more power sources 410, such as one or more batteries.

In an implementation, the electronic device 202 includes first computer-readable storage media 412 that are included in the wireless wide area network component 218 and second computer-readable storage media 414. The first computer-readable storage media 412, the second computer-readable storage media 414, or both may include volatile and nonvolatile memory and/or removable and non-removable media implemented in any type of technology for storage of information, such as computer-readable instructions, data structures, program modules or other data. The first computer-readable storage media 412, the second computer-readable storage media 414, or both may include, but are not limited to, RAM, ROM, EEPROM, flash memory or other memory technology, CD-ROM, digital versatile disks (DVD) or other optical storage, solid state storage, magnetic disk storage, removable storage media, or any other medium that can be used to store the desired information and that can be accessed by the electronic device 404. Depending on the configuration of the electronic device 102, the first computer-readable storage media 412, the second computer-readable storage media 414, or both may be a type of tangible computer-readable storage media and may be a non-transitory storage media.

The wireless wide area network component 218 may obtain the configuration file 222 from the device provider 206 at least partly in response to sending information to the device provider 206 that the electronic device 202 is to be configured for communications via the wireless wide area network 214. In an implementation, the wireless wide area network component 218 may obtain the configuration file 222 from the device provider 206 at least partly in response to the electronic device 202 sending registration information to the device provider 206. The registration information may be sent to the device provider 206 from the electronic device 202 after the individual 204 acquires the electronic device 202 from the device provider 206. In some cases, the registration information may include account information of the individual 204 with the device provider 206, an identifier of the electronic device 202, or both. Additionally, the registration information may be provided to the device provider 206 to activate warranties associated with the electronic device 202, to activate other services provided by the device provider 206 with respect to the electronic device 202, to activate communications services for the electronic device 202, or combinations thereof. In another implementation, the wireless wide area network component 218 may send a request to the device provider 206 to obtain the configuration file 222.

In various implementations, the electronic device 202 may send information to the device provider 206 indicating that the electronic device 202 is to be configured for communications via the wireless wide area network using a connection to the Internet via a local network. For example, in some cases, the wireless wide area network component 218 may be disabled and a wired local area network connection to the Internet may be used to communicate information to the device provider 206 indicating that the electronic device 202 is to be configured for communications over the wireless wide area network 214. In other situations, the wireless wide area network component 218 may be disabled and a wireless local area network connection established by the wireless local area network component 406 may be used to communicate information to the device provider 206 indicating that the electronic device 202 is be configured for communications via the wireless wide area network 214.

Additionally, in some implementations, the first computer-readable storage media 412 may store an initial configuration file that includes settings for communications via the wireless wide area network 414. In some cases, the initial configuration file may be pre-stored on the electronic device 202 by the device provider 206 before the acquisition of the electronic device 202 by the individual 204. The initial configuration file may include a subset of the settings of the configuration file 222, in some cases. For example, the initial configuration file may include a minimum number of settings for the electronic device 202 to communicate via a wireless wide area network. In situations where the first computer-readable storage media 412 stores an initial configuration file, the configuration module 228 may configure the electronic device 202 for communications via the wireless wide area network 214 to obtain the configuration file 222 from the device provider 206. To illustrate, registration information for the electronic device 202, a request for the configuration file 222, or both may be sent to the device provider 206 after the configuration module 228 configures the electronic device 202 for wireless communications according to the initial configuration file. After using the initial configuration file to obtain the configuration file 222, the configuration module 228 may then configure the electronic device 202 according to the settings of the configuration file 222. In some implementations, the configuration file 222 may include an increased number of settings for communications over the wireless wide area network 214, updated settings for communications over the wireless wide area network 214, or both.

In an implementation, the configuration module 228 may send a query to the device provider 206 to determine whether a version of the configuration file 222 stored on the electronic device 202 matches a current version of the configuration file 222 stored by the device provider 206. In some cases, the query may be sent to the device provider 206 upon an initial start-up of the electronic device 202 to determine whether a version of the configuration file 222 stored on the electronic device 202 before being acquired by the individual 204 matches a current version of the configuration file 222. In other situations, the configuration module 228 may send the query to the device provider 206 after a specified period of time has elapsed since a previous query was sent to the device provider 206. In still additional instances, the configuration module 228 may send the query to the device provider 206 when the performance of the electronic device 202 in regard to communications over the wireless wide area network 214 drops below a threshold performance. For example, a specified number of dropped calls, speed of data communicated over the wireless wide area network 214, and other criteria may be used to determine that a performance of the electronic device 202 with respect to communications over the wireless wide area network 214 have dropped below a threshold performance.

In some cases, the configuration module 228 may configure the wireless wide area network component 218 for communications via the wireless wide area network 214 at least partly in response to receiving a command to configure the electronic device 202 for communications via the wireless wide area network 214. In an implementation, a command to configure the electronic device 202 for communications via the wireless wide area network 214 may be received by the configuration module 228 at least partly in response to an initial activation of the electronic device 202 after being acquired by the individual 204 from the device provider 206. In another implementation, the command to configure the electronic device 202 for wireless communications may be received by the configuration module 228 at least partly in response to the SIM card 216 being first detected by the wireless wide area network component 218. In a particular implementation, the command to configure the electronic device 202 for communications over the wireless wide area network 214 may be received by the configuration module 228 each time that a new SIM card is detected by the wireless wide area network component 218. In situations, where the SIM card 216 is removable, the signal to configure the wireless wide area network component 218 may be produced when the SIM card 216 is inserted into a slot of the electronic device 202 and makes contact with an interface of the wireless wide area network component 218. In cases where the SIM card 216 is non-removable, the signal to configure the wireless wide area network component 218 may be produced when the SIM card 216 is reprogrammed according to different specifications for communicating via the wireless wide area network 214.

A command to configure the electronic device 202 for wireless communications may also be detected by the wireless wide area network component 218 during a registration process between the electronic device 202 and the device provider 206. In another illustrative example, a command to configure the electronic device 202 for wireless communications may be detected when a communications provider utilized by the electronic device 202 to communicate via a wireless wide area network changes, when a plan of the individual 204 with a communications provider changes, or both. In another implementation, the configuration module 228 may receive a command to configure the electronic device 202 for communications via the wireless wide area network 214 at least partly in response to obtaining an initial version of the configuration file 222 from the device provider 206. Furthermore, the configuration module 228 may receive a command to configure the electronic device 202 for communications via the wireless wide area network 214 at least partly in response to obtaining an updated version of the configuration file 222 from the device provider 206.

The configuration module 228 may include computer-readable instructions that are executable by the one or more processors 402 to configure the electronic device 202 for wireless communications. In an implementation, the configuration module 228 may access information from the configuration file 222 and configure the wireless wide area network component 218 to communicate signals over the wireless wide area network 214 according to the settings in the configuration file 222. In an implementation, the configuration module 228 may determine a communications provider to provide communications via the wireless wide area network 214. For example, the configuration module 228 may access information stored on the SIM card 216 to identify a communications provider to provide communications over the wireless wide area network 214. To illustrate, the SIM card 216 may store an identifier of a communications provider to provide communications via the wireless wide area network 214, such as an identifier of the first communications provider 208 or an identifier of the second communications provider 210.

At least partly in response to determining a communications provider to provide communications via the wireless wide area network 214, the configuration module 228 may access information in the configuration file 222 corresponding to settings of the determined communications provider and configure the electronic device 202 according to the identified settings. To illustrate, after obtaining an identifier of the first communications provider 208 from the SIM card 216, the configuration module 228 may access the first settings 224 of the configuration file 222. The configuration module 228 may then configure the electronic device 202 according to the first settings 224. In an illustrative implementation, the configuration module 228 may access the first settings 224 and make a copy of the first settings 224 to store in a cache of the wireless wide area network component 218.

In an implementation, the configuration module 228 may also provide the first communications provider 208 with information regarding features of the wireless wide area network component 216. In some cases, the configuration module 228 may produce a bitmap that indicates features of the wireless wide area network component 216 that are enabled, features of the wireless wide area network component 216 that are disabled, or both. For example, each bit of the bitmap may correspond to a particular feature of the wireless wide area network component 216 and the bit may be set to a 1 or 0 depending on whether or not the feature is enabled or disabled. To illustrate, the bitmap may include a bit for an assisted GPS support feature and the bit may be set to 1 when the assisted GPS support feature is enabled and to 0 when the assisted GPS support feature is disabled. In this way, the first communications provider 208 may utilize the information included in the bitmap when managing communications of the electronic device 202 over the wireless wide area network 204. In various implementations, the wireless wide area network component 216 may receive commands from a communications provider to enable or disable features relating to communications via the wireless wide area network 214 based on information included in the bitmap.

In some implementations, the configuration module 228 may include particular information in communications by the electronic device 202 over the wireless wide area network 214 to implement the features specified by the configuration file 222. In some cases, according to information in the configuration file 222, the configuration module 228 may include particular data in communications over the wireless wide area network 214 to implement authentication techniques with respect to the communications by the electronic device 202 over the wireless wide area network 214. In other situations, the configuration module 228 may implement communications techniques to improve the efficiency of communications by the electronic device 202 over the wireless wide area network 214. To illustrate, the configuration module 228 may decrease an amount of information in communications by the electronic device 202 over the wireless wide area network 214, include particular routing information in communications by the electronic device 202 over the wireless wide area network 214, or both. Additionally, the configuration module 228 may configure the electronic device 202 according to information in the configuration file 222 to communicate via the wireless wide area network 214 in a manner that improves power consumption of the electronic device 202.

In an illustrative implementation, the configuration module 228 may access information of the configuration file 222 from a cache of the wireless wide area network component 216 or non-volatile memory of the wireless wide area network component 216 at least partly in response to detecting a specified condition relating to communications over the wireless wide area network 214. For example, the configuration module 228 may detect a condition relating to determining whether or not to implement a particular feature for communications of the wireless wide area network component 216. To illustrate, the configuration module 228 may access a cached copy of settings of the configuration file 222 to determine whether a handover feature is to be implemented when changing from communicating via a 3G wireless wide area network to a 4G wireless wide area network. In this situation, the configuration module 228 may receive information indicating that the electronic device 202 has moved into a region where communications via a 4G wireless wide area network are available and, in response, the configuration module 228 may access the cached settings of the configuration file 222 to determine whether or not to implement a handover feature. In another illustration, the configuration module 228 may receive information indicating that a voice call is being initiated and, in response, the configuration module 228 may access the cached settings of the configuration file 222 to determine whether Voice over Internet Protocol (VoIP) calls are supported.

In some implementations, the settings of the configuration file 222 may indicate that features used in communications over the wireless wide area network 214 are enabled or disabled. In these cases, the configuration module 228 may access the settings of the configuration file 222 to determine whether or not to implement a particular feature when detecting a condition where the feature may be implemented. In one example, the settings of the configuration file 222 may indicate whether a handover feature is enabled when the electronic device 202 changes from communicating via a 3G wireless wide area network to a 4G wireless wide area network, when the electronic device 202 changes from communicating via a 4G wireless wide area network to a 3G wireless wide area network, or both. In another example, the configuration file 222 may indicate whether VoIP calling is enabled. In an additional example, the configuration file 222 may indicate whether assisted GPS support is enabled to utilize wireless wide area network data, as well as, GPS data for determining a location of the electronic device 202. In a further example, the configuration file 222 may indicate whether High-Speed Downlink Packet Access (HSPDA) is enabled for the wireless wide area network component 216 and/or whether High-Speed Uplink Packet Access (HSUPA) is enabled for the wireless wide area network component 216 to communicate information via the wireless wide area network 214. In still another example, the configuration file 222 may indicate whether dual carrier HSDPA, dual carrier HSUPA, or both are enabled to communicate information via the wireless wide area network 214. In other examples, the configuration file 222 may indicate whether continuous packet connectivity is supported by the wireless wide area network component 216 to communicate information via the wireless wide area network 214 and/or to regulate power consumption of the electronic device 202. In various examples, the configuration file 222 may indicate whether an auto-answer feature is enabled with respect to the automatic answering of calls by a wireless local area network device in communication with the electronic device 202.

In other situations, the settings of the configuration file 222 may include data used by the wireless wide area network component 216 in communications via the wireless wide area network 214. In these instances, the configuration module 228 may utilize the data in appropriate circumstances. In an example, the configuration file 222 may indicate encryption algorithms supported by the wireless wide area network component 216. In another example, the configuration file 222 may indicate messaging information, such as a short message service (SMS) retry period, a SMS retry interval, a maximum number of SMSs to be communicated via the wireless wide area network 214, or a combination thereof. With respect to messaging information, the configuration file 222 may also indicate preferences for circuit switched messages, packet switched messages, and/or Internet Protocol Multimedia Subsystem (IMS) messaging. In an additional example, the configuration file 222 may indicate a priority for network use, such as a priority with respect to the use of a LTE wireless wide area network, the use of a CDMA wireless wide area network, and/or the use of a GSM wireless wide area network. The configuration file 222 may also indicate radio access technologies supported, such as LTE, CDMA, and/or GSM. In a further example, the configuration file 222 may indicate a multislot class for a general packet radio service (GPRS) network, a multislot class for an enhanced data rates for GSM evolution (EDGE) network, or both for the communication of data over the wireless wide area network 214. In still another example, the configuration file 222 may indicate a third generation partnership project (3GPP) specification version, such as release 99, release 6, release 7, and the like. In some examples, the configuration file 222 may also indicate a service domain preference of voice or data for communications via wireless wide area networks. In other examples, the configuration file 222 may indicate a preferred frequency band support spectrum for communications over the wireless wide area network 214.

A signal modulation/demodulation component 416 may include computer-readable instructions that are executable by the one or more processors to wirelessly communicate signals. The signal modulation/demodulation component 416 may include software, firmware, or both. In some implementations, the signal modulation/demodulation component 416 may be configured by the configuration module 228 according to information included in the configuration file 222. For example, the signal modulation/demodulation component 416 may be configured by the configuration module 228 to send and/or receive signals over a wireless wide area network to implement features specified by one or more communications providers. In an illustrative implementation, the signal modulation/demodulation component 416 includes a modem.

The second computer-readable storage media 414 may be used to store any number of functional components that are executable on the one or more processors 402, such as an operating system 418 and one or more applications 420. The second computer-readable storage media 414 may also store content items 422, such as electronic books, audio books, music videos, still images, and the like. In some cases, the one or more applications 420 may render some of the content items 422 for display on a display device of the electronic device 102. For instance, the one or more applications may include an electronic book reader application to render textual electronic books. In other cases, the one or more applications 420 may include an audio player for playing audio books or songs, a video player for playing video, and so forth.

Figure 5:
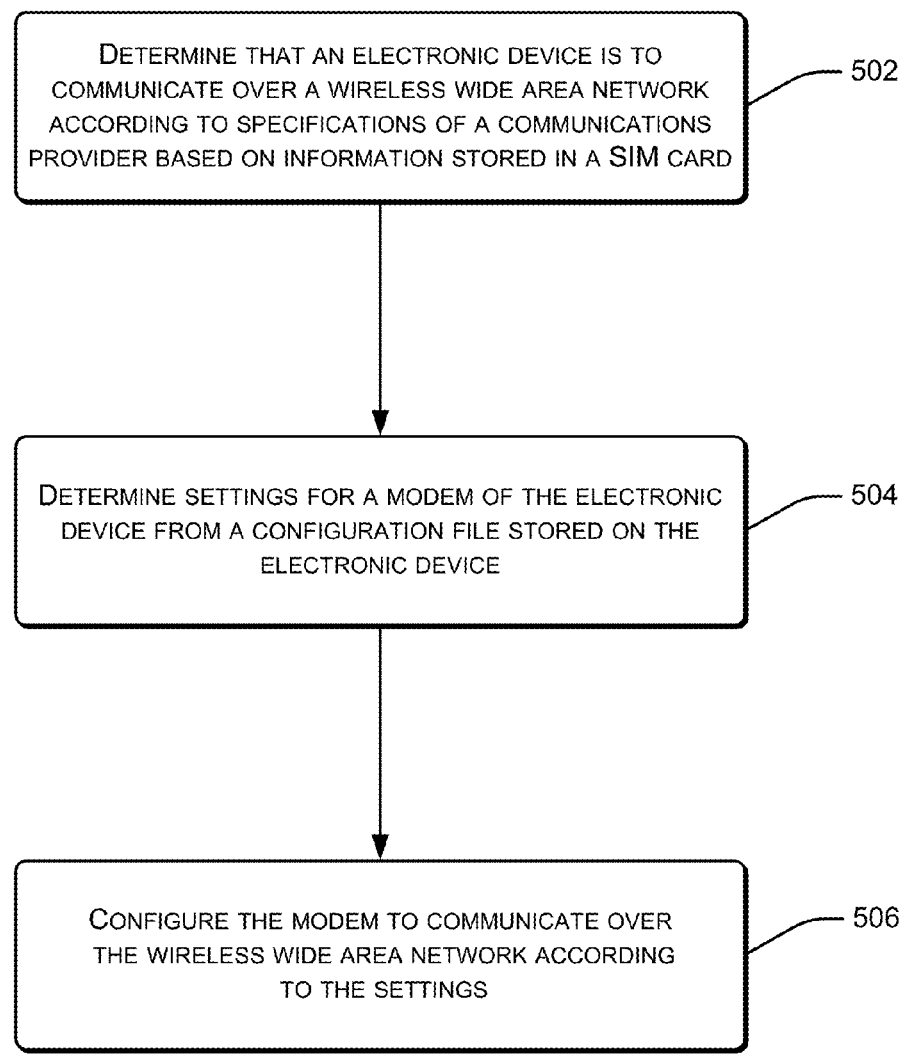
FIG. 5 illustrates a flow diagram of an example process to configure an electronic device for wireless communications.
Figure 6:
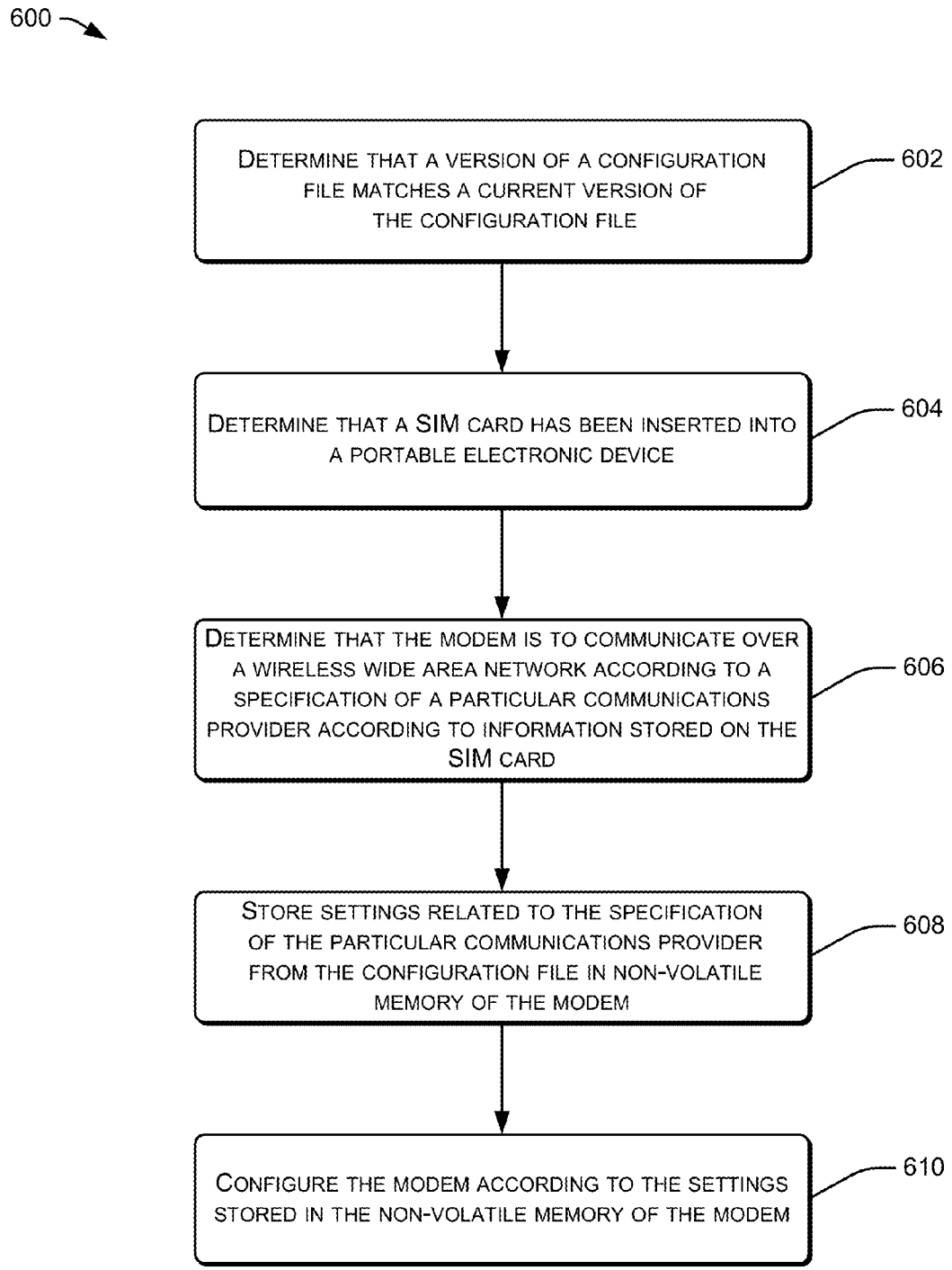
FIG. 6 illustrates a flow diagram of an example process to obtain a configuration file and configure an electronic device for wireless communications using the information in the configuration file.
Figure 7:
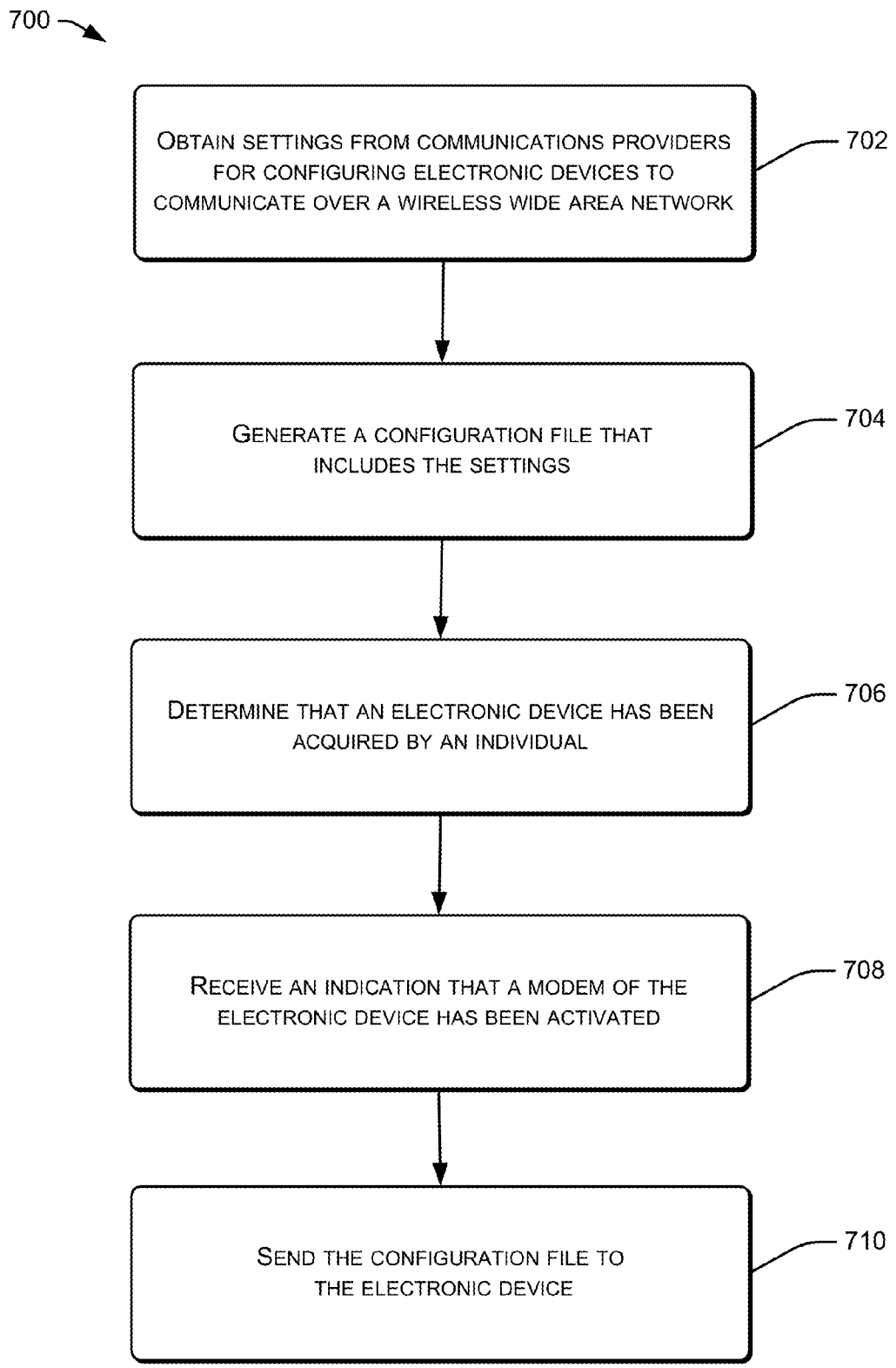
FIG. 7 illustrates a flow diagram of an example process to generate a configuration file to provide to an electronic device for configuring the electronic device for wireless communications.

FIGS. 5, 6, and 7 are flow diagrams illustrating example processes for configuring an electronic device for wireless communications according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 illustrates a flow diagram of an example process 500 to configure an electronic device for wireless communications. At 502, the process 500 includes determining that an electronic device is to communicate over a wireless wide area network according to one or more specifications of a communications provider. In some cases, the communications over the wireless wide area network may be with the communications provider. The communications may also relate to telephone calls, electronic messages (e.g., SMS messages), content (e.g., video content, audio content, image content, application content, and the like), and so forth.

In an implementation, the communications provider may be determined based on information stored on a subscriber identification module (SIM) card. For example, the SIM card may include an identifier of the communications provider and the electronic device may determine that communications over the wireless wide area network are to take place using features associated with the communications provider based on the identifier of the communications provider stored on the SIM card. In various implementations, the electronic device may identify the communications provider from the information stored on the SIM card at least partly in response to determining that the SIM card has been inserted into the electronic device.

In some cases, the SIM card may store additional information. To illustrate, the SIM card may store a unique serial number (ICCID) that identifies the SIM card. The SIM card may also store an international mobile subscriber identifier (IMSI) to identify a user of the electronic device on a wireless wide area network. The SIM card may also store security authentication and ciphering information (e.g., a personal identification number (PIN) of an individual using the electronic device, a code to unlock or reset the PIN, etc.), temporary information related to communicating via a wireless wide area network, a list of the services the electronic device may access, or a combination thereof.

At 504, the process 500 includes determining settings for a modem of the electronic device from a configuration file stored on the electronic device. The settings may be the settings used by the modem to communicate over the wireless wide area network according to specifications of the communications provider. In an implementation, the settings may indicate that a first feature is to be enabled and utilized by the modem in communicating over the wireless wide area network. Additionally, the settings may indicate that a second feature is to be disabled by the modem in communicating over the wireless wide area network. In an illustrative implementation, the first feature may be an authentication feature to authenticate communications of the modem over the wireless wide area network; and the second feature may be a handover procedure used by the modem to switch from communicating over a fourth generation (4G) wireless wide area network to communicating over a third generation (3G) wireless wide area network.

The electronic device may obtain the configuration file from a device provider after sending account information of an individual to the device provider as part of a registration process with the device provider. The account information may indicate that the individual acquired the electronic device from the device provider. The account information may also indicate additional information, such as an identifier of the individual with the device provider, an identifier of the electronic device, additional information related to the electronic device, or combinations thereof.

At 506, the process 500 includes configuring the modem to communicate over the wireless wide area network according to the settings of the configuration file. Configuring the modem to communicate over the wireless wide area network according to the settings may include enabling the modem to communicate using one or more features, disabling the modem from communicating over the wireless wide area network using one or more additional features, or both. In an implementation, the modem may be rebooted after configuring the modem to communicate over the wireless wide area network according to the settings of the configuration file.

In some cases, the modem may be configured according to an updated configuration file received from the device provider. The updated configuration file may include updated settings to configure the modem to communicate over the wireless wide area network according to updated specifications of the communications provider. In some cases, the updated configuration file may include updated settings for multiple communications providers. In other situations, the updated configuration file may include settings for a newly added communications provider.

FIG. 6 illustrates a flow diagram of an example process 600 to obtain a configuration file and configure an electronic device for wireless communications using the configuration file. At 602, the process 600 includes determining that a version of a configuration file stored on the electronic device matches a current version of the configuration file. The configuration file may be used to configure a modem of the electronic device to communicate over wireless wide area networks. In other implementations, the electronic device may determine that a version of the configuration file stored on the electronic device does not match the current version of the configuration file. In some cases, the electronic device may make the determination as to whether or not the version of the configuration file stored by the electronic device matches the current version of the configuration file by sending a query to a device provider that provided the electronic device to an individual.

The configuration file may include first settings to configure the modem to communicate via a wireless wide area network according to a first specification of a first communications provider and second settings to configure the modem to communicate via the wireless wide area network according to a second specification of a second communications provider. In an implementation, at least one of the second settings may be different from at least one of the first settings. In an implementation, the electronic device may obtain the configuration file from a device provider from which an individual acquired the electronic device. In various situations, the device provider may be an original equipment manufacturer (OEM). In some cases, the configuration file may be obtained from the device provider after establishing a connection with a wireless local area network. Additionally, the configuration file may be obtained after sending login information and a device identifier to the device provider. The login information may be associated with an account of an individual with the device provider and the device identifier may uniquely identify the electronic device.

At 604, the process 600 includes determining that a SIM card has been inserted into an electronic device. In some implementations, the SIM card may be associated with a communications provider that provides services in regard to communicating over a wireless wide area network. In various implementations, the SIM card may be inserted into the electronic device after the electronic device has been acquired from a device provider. In an illustrative implementation, the electronic device may provide one or more user interfaces to prompt an individual to insert the SIM card into the electronic device upon powering on the electronic device for the first time.

At 606, the process 600 includes determining that the modem is to communicate via the wireless wide area network according to the first specification of the first communications provider; based at least in part on the identifier of the SIM card. In an implementation, the electronic device may identify the communications provider from among the plurality of communications providers according to the identifier stored on the SIM card. In a particular implementation, the electronic device may match the identifier stored on the SIM card with identifiers of communications providers stored in another file of the electronic device.

At 608, the process 600 includes storing settings related to the specifications of the particular communications provider from the configuration file in non-volatile memory of the modem. In some cases, the settings may be identified in the configuration file and then retrieved from the configuration file. In an illustrative implementation, the settings of the particular communications provider may represent a portion of the settings included in the configuration file. In a particular implementation, the settings associated with the communications provider may be stored in a settings data structure, also referred to as a settings stable, of the non-volatile memory of the modem. In some scenarios, the settings stored in the data structure may be copied into a cache of the modem. Additionally, the settings may be copied into the cache of the non-volatile memory in response to the electronic device being powered up, such as when the electronic device is turned on.

At 610, the process 600 includes configuring the modem according to the settings stored in the non-volatile memory of the modem. In an implementation, configuring the modem to communicate according to settings stored in the non-volatile memory may include disabling the modem from using a communication technique. Additionally, configuring the modem to communicate according to settings stored in the non-volatile memory may include enabling the modem to use a specified communication technique. In a particular implementation, the modem may be configured to communicate according to the settings by accessing cached settings of the modem and determining whether one or more features are enabled or disabled according to the cached settings.

In some cases, after configuring the modem according to the settings of the communications provider, the SIM card may be removed from the electronic device and another SIM card may be inserted into the electronic device. In an implementation, the new SIM card may be associated with an additional communications provider. In an illustrative implementation, the new SIM card may include an identifier of the additional communications provider. Additionally, the additional communications provider may have different specifications for communicating via the wireless wide area network. Thus, the configuration file may include settings for the additional communications provider that are different from the settings for the initial communications provider. The settings of the additional communications provider may be stored in non-volatile memory of the electronic device and the electronic device may proceed to configure the modem of the electronic device according to the settings of the additional communications provider. In some implementations, by configuring the electronic device for communications using the settings of the additional communications provider, some features may be disabled that were enabled when communicating using the settings of the initial communications provider. In other implementations, features may be enabled when communicating using the settings of the additional communications provider that were previously disabled when communicating using the settings of the initial communications provider. Furthermore, in some instances, the new SIM card may be removed from the electronic device and the initial SIM card may be re-inserted into the electronic device. In these situations, the modem may be reconfigured according to the settings associated with the initial communications provider.

FIG. 7 illustrates a flow diagram of an example process 700 to generate a configuration file to provide to an electronic device for configuring the electronic device for wireless communications. At 702, the process 700 includes a device provider obtaining settings from communications providers for configuring electronic devices to communicate over a wireless wide area network. In some cases, the device provider may send a request to each communications provider for settings used to implement specifications of the respective communications providers. In other situations, the device provider may receive settings from the communications providers without sending a request.

At 704, the process 700 includes generating a configuration file that includes the settings. In various implementations, the device provider may generate a single configuration file that includes settings of a plurality of communications providers. In some scenarios, the device provider may generate a single configuration file that includes settings for each respective communications provider of a number of communications providers.

At 706, the process 700 includes determining that an electronic device has been acquired by an individual. For example, the device provider may determine that an individual has acquired the electronic device at least partly in response to receiving registration information from the electronic device. In some cases, the registration information may include information associated with an account of the individual with the device provider.

At 708, the process 700 includes receiving an indication that a modem of the electronic device has been activated. Before the modem has been activated, the electronic device may be unable to communicate via a wireless wide area network. By activating the modem, the electronic device may begin a procedure for configuring the modem and enabling communications via a wireless wide area network. In some cases, the modem may be activated by powering on the electronic device for the first time.

At 710, the process 700 includes sending the configuration file to the electronic device. In an implementation, the device provider may send the entire configuration file to the electronic device. In other implementations, the device provider may send a portion of the configuration file to the electronic device. In still other implementations, the device provider may send information to the electronic device that may be utilized to access a remotely stored version of the configuration file. For example, the device provider may send a storage location for at least a portion of the configuration file to the electronic device. In another example, the device provider may send authentication information, such as a key, to the electronic device that the electronic device may utilize to access at least a portion of the configuration file.

Although the techniques have been described in language specific to structural features and/or methodological acts, it is to be understood that the appended claims are not necessarily limited to the features or acts described. Rather, the features and acts are described as example implementations of such techniques.

What is claimed is:

1. A portable electronic device comprising:
one or more processors;
a subscriber identification module (SIM) card including an identifier of a first communications provider;
a modem to communicate via a wireless wide area network, the modem including a non-volatile memory;
one or more computer-readable storage media storing:
a configuration file including first settings to configure the modem to communicate via the wireless wide area network according to a first specification of the first communications provider and second settings to configure the modem to communicate via the wireless wide area network according to a second specification of a second communications provider, at least one of the second settings being different from at least one of the first settings; and
instructions executable by the one or more processors to perform operations comprising:
determining that a version of the configuration file matches a current version of the configuration file;
determining that the SIM card has been inserted into the portable electronic device;
determining, based at least in part on the identifier of the first communications provider, that the modem is to communicate via the wireless wide area network according to the first specification of the first communications provider;
storing the first settings in the non-volatile memory of the modem; and
configuring the modem to communicate via the wireless wide area network according to the first settings.

2. The portable electronic device of claim 1, wherein the operations further comprise:
connecting to a wireless local area network;
sending login information and a device identifier to an original equipment manufacturer (OEM) of the portable electronic device via the wireless local area network, the login information being associated with an account of an individual with the OEM and the device identifier uniquely identifying the portable electronic device.

3. The portable electronic device of claim 1, wherein storing the first settings in the nonvolatile memory includes storing the first settings in a settings data structure of the nonvolatile memory, and the operations further comprise:
determining that the portable electronic device has been turned on;
copying the first settings from the settings data structure to a cache of the modem;
accessing information stored in the cache of the modem;
determining that a feature of the first specification is enabled based, at least in part, on the information stored in the cache of the modem; and
configuring the modem to communicate via the wireless wide area network according to the feature.

4. The portable electronic device of claim 1, wherein the operations further comprise:
generating a bitmap to indicate that a first feature of the modem is enabled and that a second feature of the modem is disabled;
sending the bitmap to the first communications provider; and
receiving a command from the first communications provider to cause the modem to communicate via the wireless wide area network according to the first feature.

5. A method comprising:
determining that a version of a configuration file stored on an electronic device matches a current version of the configuration file, the stored configuration file including a number of settings for configuring a modem of the electronic device to communicate over a wireless wide area network;
determining that a subscriber identification module (SIM) card is coupled to the electronic device;
obtaining information from the SIM card identifying a communications provider from multiple communications providers;
determining settings from the configuration file, the settings corresponding to the communications provider; and
configuring the modem, using the settings, to communicate over the wireless wide area network by enabling at least a first feature to be utilized by the modem in communicating over the wireless wide area network and disabling at least a second feature related to communicating over the wireless wide area network.

6. The method of claim 5, further comprising sending, to the communications provider, information regarding the settings indicating that the first feature of the electronic device is enabled and the second feature of the electronic device is disabled.

7. The method of claim 5, wherein:
the first feature is an authentication feature to authenticate communications of the modem over the wireless wide area network; and
the second feature is a handover procedure used by the modem to switch from communicating over a fourth generation (4G) wireless wide area network to communicating over a third generation (3G) wireless wide area network.

8. The method of claim 5, wherein the operations further comprise:
receiving an updated configuration file including updated settings corresponding to the communications provider; and
configuring the modem, using the updated settings, to communicate over the wireless wide area network.

9. The method of claim 5, wherein the operations further comprise:
determining that the SIM card has been inserted into the electronic device;
sending account information to a device provider, the account information indicating that an individual acquired the electronic device from the device provider;
receiving the configuration file from the device provider; and
storing the configuration file in non-volatile memory of the modem.

10. The method of claim 5, wherein:
the settings are first settings and the communications provider is a first communications provider; and
the configuration file includes second settings of a second communications provider, the second settings for configuring the modem to communicate over the wireless wide area network with the second communications provider.

11. The method of claim 10, further comprising:
receiving an updated configuration file including updated first settings and updated second settings; and
configuring the modem, using the updated first settings, to communicate over the wireless wide area network with the first communications provider.

12. The method of claim 11, wherein the updated configuration file includes third settings of a third communications provider, the third settings for configuring the modem to communicate over the wireless wide area network with the third communications provider.

13. The method of claim 5, further comprising rebooting the modem after configuring the modem, using the settings, to communicate over the wireless wide area network.

14. An electronic device comprising:
a modem;
one or more processors;
a wireless wide area network component coupled with a subscriber identification module (SIM) card and instructions executable by the one or more processors to perform operations comprising:
storing a configuration file, the configuration file including a number of settings for configuring the modem to communicate via a wireless wide area network with a plurality of communications providers;
identifying a communications provider from among the plurality of communications providers according to an identifier stored on the SIM card;
obtaining, from the configuration file, settings corresponding to the communications provider; and
configuring the modem, using the settings, to communicate via the wireless wide area network with the communications provider by enabling at least a first feature to be utilized by the modem in communicating over the wireless wide area network and disabling at least a second feature related to communicating over the wireless wide area network.

15. The electronic device of claim 14, wherein:
the SIM card is a first SIM card, the settings are first settings, and the communications provider is a first communications provider; and
the operations further comprise:
determining that a second SIM card has been inserted into the electronic device;
identifying a second communications provider from among the plurality of communications providers according to an additional identifier stored on the second SIM card;
obtaining, from the configuration file, second settings corresponding to the second communications provider; and
configuring the modem, using the second settings, to communicate via the wireless wide area network with the second communications provider.

16. The electronic device of claim 15, wherein the operations further comprise:
determining that the second SIM card has been removed from the electronic device; and
determining that the first SIM card has been inserted into the electronic device.

17. The electronic device of claim 16, wherein the operations further comprise reconfiguring the modem, using the first settings, to communicate via the wireless wide area network with the first communications provider.

18. The electronic device of claim 14, wherein the operations further comprise:
generating a bitmap indicating features of the electronic device to communicate over the wireless wide area network that are disabled and features of the electronic device to communicate over the wireless wide area network that are enabled; and
sending the bitmap to the communications provider.

19. The electronic device of claim 14, wherein the operations further comprise:
determining that the configuration file does not match a current version of the configuration file; and
obtaining an updated version of the configuration file from a device provider.

20. The electronic device of claim 14, further comprising a wireless local area network component, and the operations further comprise receiving the configuration file via the wireless local area network component.

* * * * *